Figure 1:
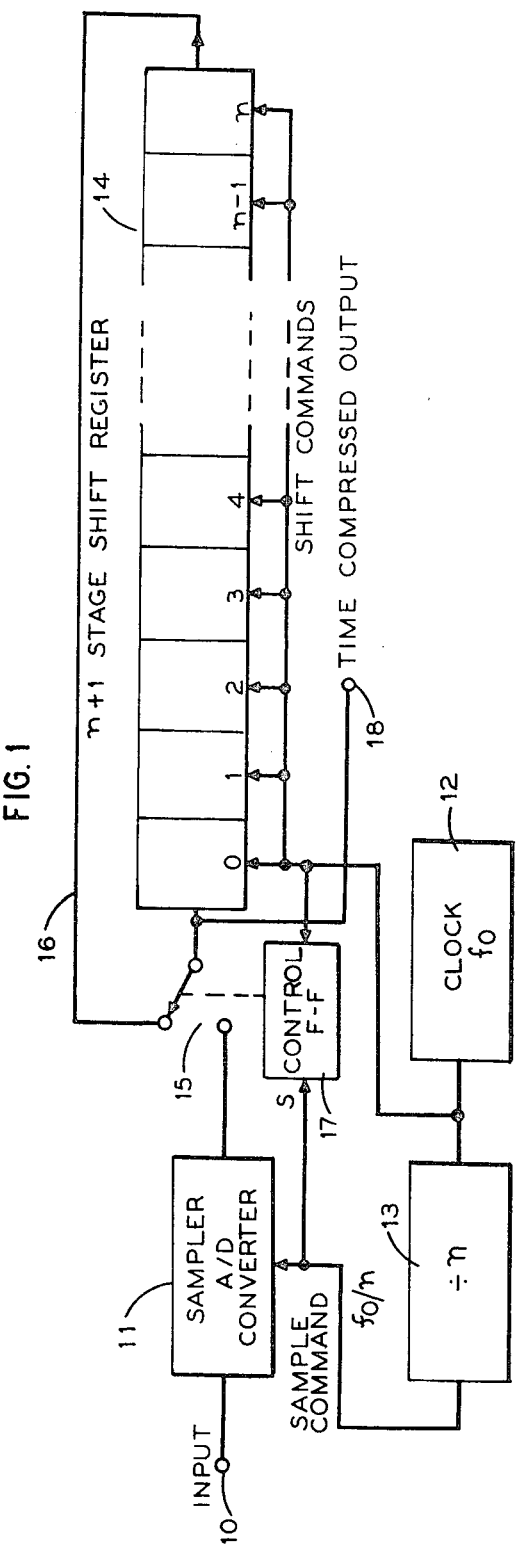

United States Patent

Wold

[15] 3,646,334
[45] Feb. 29, 1972

[54] REAL-TIME CORRELATOR

[72] Inventor: Ivar Wold, Farnborough, Hampshire, England

[73] Assignee: The Solartron Electronic Group Limited, Farnborough, England

[22] Filed: May 27, 1970

[21] Appl. No.: 40,987

[30] Foreign Application Priority Data

May 28, 1969 Great Britain......................27,044/69

[52] U.S. Cl........................................235/181, 343/100 CL
[51] Int. Cl.........................................G06f 15/34, G06f 7/04
[58] Field of Search.............................235/181; 343/100 CL

[56] References Cited

OTHER PUBLICATIONS

Gatland, H. B. et al., " A Correlation Function Computer Using Delta Modulation Techniques," In J. Sci. Instrum. 42(8): p. 529– 532. Aug. 1965. Q 184.J7.

Primary Examiner—Malcolm A. Morrison
Assistant Examiner—R. Stephen Dildine, Jr.
Attorney—William R. Sherman, Stewart F. Moore, Jerry M. Presson and Roylance, Abrams, Kruger, Berdo and Kaul

[57] ABSTRACT

In various circumstances, such as the recovery of a signal from a noisy background, two signals $x(t)$ and $y(t)$ are to be correlated. In this invention $x(t)$ is sampled at recurrence period $n/f_o$ ($n$ is at least 2). The samples are put into a recirculating memory of circulation time $(n+1)f_o$ with erasure of existing samples at point of insertion. The memory is coupled to a multiplier which multiplies the output of the memory with synchronized samples of $y(t)$. The output of the multiplier is applied to an averaging memory. Only one multiplier is used to give the correlation function at $n$ different time delays and hence greatly simplified apparatus is provided.

5 Claims, 6 Drawing Figures

INVENTOR.
Ivar Wold
BY
ATTORNEY

REAL-TIME CORRELATOR

The present invention relates to real-time correlators.

Real-time correlators have various applications such as the recovery of signals in a transmission system especially where there is significant background noise, or flow measurement in pipes, or speed measurement of for example strip in a strip mill.

Derivation or measurement of correlation functions are relatively easy on a point-to-point basis, but real-time computation of correlation functions has required a large number of parallel computing circuits. For example arrangements are described in the Princeton Applied Research Corporation Technical Bulletin No. 149 and Electronics, Oct. 31, 1966 which makes use of parallel output shift registers 100 elements long and 100 hybrid multipliers to compute real-time correlation functions.

An object of the present invention is to provide an improved real-time correlator of substantially simplified construction.

According to the present invention a real-time correlator comprises a first signal sampler for sampling a first signal $x(t)$ of two signals $x(t)$ and $y(t)$ to be correlated and arranged to provide samples of $x(t)$ at a recurrence period of $n/f_o$ where $n$ is an integer of at least 2 and $f_o$ is a given frequency, a recirculating memory having a circulating time of $(n+1)/f_o$, means coupling the first sampler to the memory and arranged to inject each sample of $x(t)$ as it occurs into the memory with erasure of any previous sample occupying the position in the memory at which the injected sample is received, means coupling the memory to a multiplier to apply to the multiplier the sequence of samples circulating in the memory, a second sampler for sampling the second signal $y(t)$ and arranged to provide samples thereof at the said recurrence period of $n/f_o$ and to apply each sample of the second signal $y(t)$ for an interval of $n/f_o$ to the multiplier, and means for applying the output of the multiplier to an averaging memory providing an output representative of the correlation function of $x(t)$ and $y(t)$ for $n$ different time delays at increments of $1/f_o$. Thus by means of the invention a real-time correlator can be provided with only one multiplier and giving the correlation function at $n$ different time delays.

Figure 2:
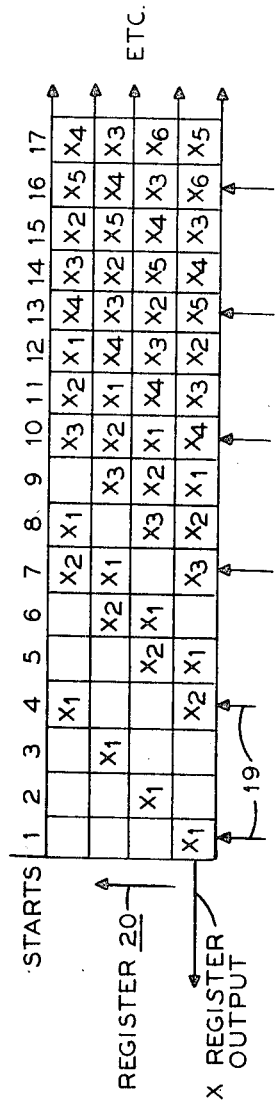
Figure 3:
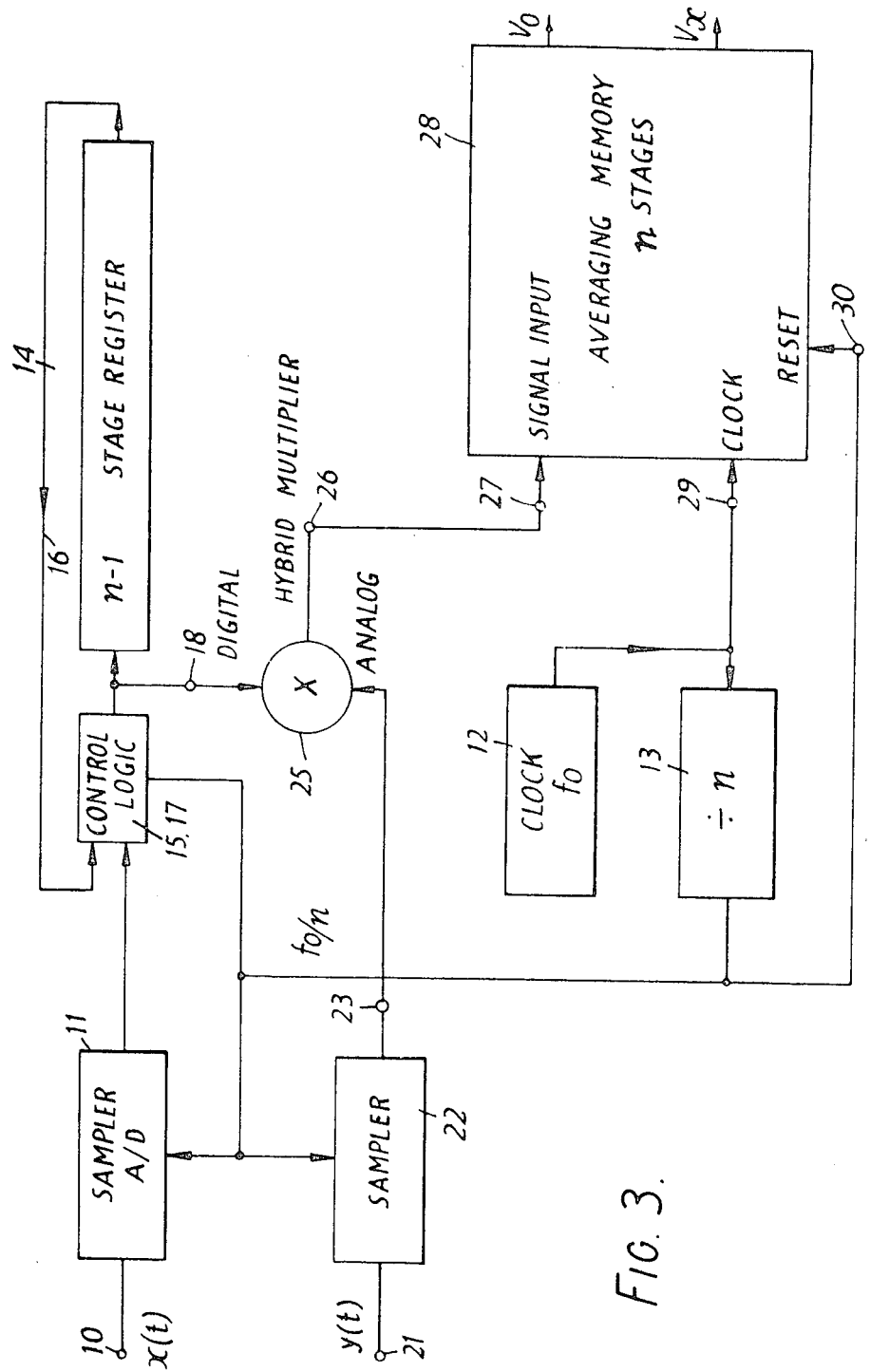
Figure 4:
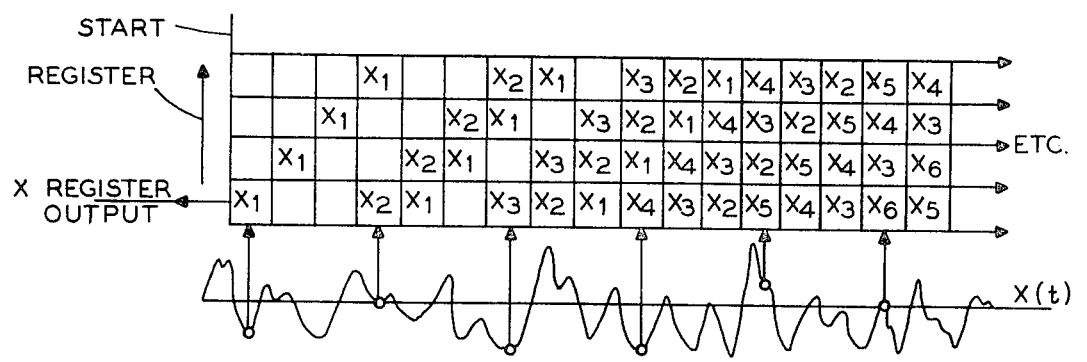
Figure 4:
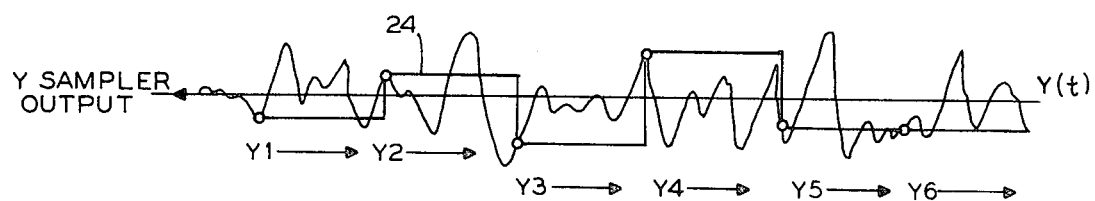
Figure 5:
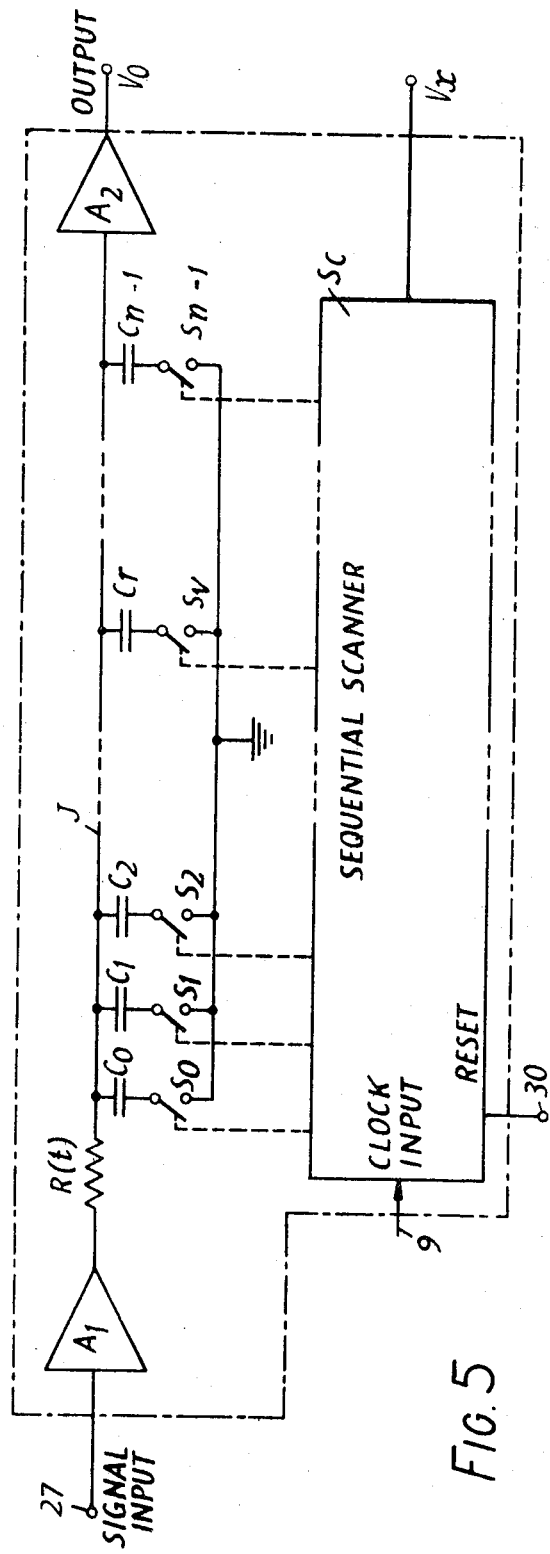

The invention will now be described by way of example with reference to the accompanying drawings, in which FIG. 1 is a block diagram of a known time-compressor, FIG. 2 is an explanatory diagram used in describing the operation of the apparatus shown in FIG. 1, FIG. 3 is a block diagram of one embodiment of the invention, FIG. 4 is an explanatory diagram for use in conjunction with FIG. 3, FIG. 5 is a block diagram of an averaging memory used in the embodiment of FIG. 3, and FIG. 6 herewith is a circuit diagram of a hybrid multiplier.

Referring to FIG. 1, the time-compressor shown can be as used in the Federal Scientific Corporation Spectrum Analyser Model UA7 and described in Federal Scientific Corporation Technical Bulletin 662 July 1966. An input terminal 10 is connected to a sampler and analogue-to-digital (A/D) converter 11. The signal $x(t)$ applied to the terminal 10 can be of any analogue form. Sample-command signals are applied to the sampler and A/D converter 11 from a clock-pulse generator 12 of frequency $f_o$ through a frequency divider 13 of division ratio $n$.

Another output from the clock-pulse generator 12 is applied directly to a shift register 14 to provide shift-command pulses therefor and the output of the A/D converter 11 is applied to the shift register 14 through a selector switch 15. The switch 15 is an electronic switch but for simplicity in the drawing it is shown schematically as a mechanical switch.

The shift-register 14 is arranged as a recirculating memory by a coupling 16 from the last stage thereof to the first stage through the switch 15. A bistable circuit 17 controls the switch 15 which is normally in its reset condition whereby the coupling 16 is connected to the first stage of the shift register which then functions as the recirculating memory.

The bistable circuit 17 is reset by clock-pulses applied directly thereto from the clock-pulse generator 12 and is set by each sample-command pulse which is also applied thereto from the divider 13.

When set by a command pulse the bistable circuit 17 causes the switch 15 to disconnect the coupling 16 from the first stage of the shift register and to connect the output of the A/D converter in its place. An output terminal 18 is connected to the output side of the switch 15.

Given that the clock-pulse frequency is $f_o$ and the divider 13 divides by $n$, the shift register is arranged to have $(n+1)$ stages.

In operation, the shift register recirculating memory 14 receives shift-command pulses at the frequency $f_o$ whereas the sampler and A/D converter 11 receives one sample-command pulse for every $n$ clock-pulses. The bistable circuit 17 is also set by each sample-command pulse and hence is set once for every $n$ clock-pulses.

Simultaneous operation of the switch 15 and the sampler and A/D converter 11 by the sample-command pulse causes the digitised sample of the signal at 10 to be put into the first stage of the memory 14. The sample is shifted around the memory at the frequency $f_o$ and when shifted into the last stage the $n^{th}$ clock-pulse and hence the next sample-command pulse occurs. Thus the second digitised sample is put into the first stage of the memory.

When the next shift-command pulse occurs the second sample is shifted into the second stage and the first sample into the first stage. Thus the two samples move through the memory in juxtaposition.

This action continues until samples occupy all stages of the register. On the occurrence of the next sample-command pulse transfer of the sample in the last into the first stage is prevented by operation of the switch 15 whereby that sample is erased and a new sample takes its place. This erasure and injection of a new sample takes place with every succeeding sample-command pulse.

Referring now to FIG. 2, this is an explanatory diagram illustrating the action of the arrangement of FIG. 1 for the simple case of $n=3$ and hence the shift register has four stages. In FIG. 2 seventeen shift-command periods are marked 1 to 17 above corresponding columns each of four squares. The four squares proceeding from the bottom to the top in each column represent the four stages of the shift register in order from first to last. The samples are given the reference $x_1, x_2 \ldots x_6$ and the position of each sample in the register for each shift-command period is as shown. The arrows 19 indicate sample-command pulses causing new samples to be injected into the register. The arrow 20 indicates the direction in which samples are shifted through the register.

Thus the first sample $x_1$ is injected in period 1 and is shifted in periods 2 and 3 to the second and third stages respectively of the register. On the occurrence of the next sample-command pulse (period 4) $x_1$ is shifted into the fourth stage and $x_2$ is injected into the first stage. In period 5 $x_1$ is recirculated into the first stage and $x_2$ is shifted into the second stage and so on.

In period 10 the register is filled and contains samples $x_4, x_1, x_2$ and $x_3$ as shown. AS shown in period 13 when $x_5$ is injected $x_1$ is erased. Similarly in period 16 when $x_6$ is injected $x_2$ is erased.

By taking an output from the first stage of the register the output from period 7 onwards consists of $x_3, x_2, x_1, x_4, x_3, x_2, x_5, x_4, x_3, x_6, x_5$ occurring at the frequency $f_o$ from samples taken at the frequency $f_o/3$.

Referring now to FIG. 3, this is a block diagram of a real-time correlator according to the invention embodying the apparatus of FIG. 1. Like parts in FIGS. 1 and 3 are given the same reference.

The function of the arrangement of FIG. 3 is to correlate a signal $y(t)$ applied to an input terminal 21 with a signal $x(t)$ applied to the input terminal 10.

Sample-command pulses from the divider 13 are applied to a sampler 22 in addition to the sampler and A/D converter 11. The sampler 22 is arranged to sample the signal $y(t)$ on the occurrence of each sample-command signal and to deliver the sampled value to its output until the occurrence of the next sample-command pulse.

FIG. 4 shows the output at 18 and the output at 23 from the sampler 22 for the case where $n=3$ as described with reference to FIG. 1. It will be appreciated that FIG. 4 consists of FIG. 2 with the addition of the signal $x(t)$, the signal $y(t)$ and the samples $y_1$ to $y_6$ of $y(t)$ the samples $y_1$ to $y_6$ being indicated in thick lines such as 24.

The digital output at 18 and the analogue output at 23 are applied to a hybrid multiplier 25 which is a known device but will be described later. In the multiplier they are multiplied together and the product in analogue form appears at 26 from where it is applied to the input terminal 27 of an averaging memory. Clock-pulses from the generator 12 are also applied to the averaging memory 28 through an input terminal 29, and reset pluses at the sample-command frequency are applied to the averaging memory 28 from the divider 13 through a terminal 30.

The averaging memory is a known arrangement and may be as described in Princeton Applied Research Corporation Technical Bulletin T162. However, a brief description will now be given with reference to FIG. 5. The input terminal 27 is connected through an amplifier $A_1$ and a resistor $R(t)$ to a rail J. Between the rail J and earth is an array of capacitors $C_o$, $C_1 \ldots C_{(m-1)}$ each with a series connected switch $S_o$, $S_1 \ldots S_{9m-1}$. The switches are controlled by a sequential scanner $S_c$ in such a way that they are closed for a short period in turn by clock-pulses applied at 29, only one switch being closed at any one time. Each cycle or scan is made to repeat by a reset pulse applied at 30.

The rail J is connected to the input of an amplifier $A_2$ which is arranged to have a very high input impedance. Thus with any one of the switches closed, say switch $S_r$, the output from the amplifier $A_2$ is the voltage stored on the capacitor $C_r$ which approaches the value of the input signal at 27 in the interval when $S_r$ is closed.

It will be appreciated therefore that in each scanning cycle the voltages on the capacitors are modified to a new estimate of average which appears at the same time at the output terminal $V_o$ of the amplifier $A_2$.

The sequential scanner $S_c$ is arranged to provide an output at $V_x$ proportional to memory position, i.e., with switch $S_r$ closed the output voltage is $V_r$ where V is a constant voltage. Thus the output at $V_o$ can be displayed on a cathode ray tube using $V_x$ for horizontal deflection and $V_o$ for vertical deflection.

In FIG. 3 the averaging memory of FIG. 5 is provided with $n$ stages and it will be appreciated that following the beginning of each cycle the $r^{th}$ product from the multiplier is always put into the $r^{th}$ position in the averaging memory.

The output from the hybrid multiplier will be as follows for the case of $n=3$:

$$\text{Delay} \ldots \quad \frac{y_3 \ x_3, \ y_3 \ x_2, \ y_3 \ x_1}{0 \quad 1 \quad 2} \quad \frac{y_4 \ x_1, \ y_4 \ x_3, \ y_4 \ x_2}{0 \quad 1 \quad 2} \text{ etc.}$$

Thus the voltage on, say, $C_r$ in the averaging memory will approach the correlation between $x(t)$ and $y(t)$ at a delay of $\tau_r = r/f_o$ seconds. An oscilloscope connected to display the output $V_o$ against $V_x$ will show the correlation function of $x(t)$ and $y(t)$ for $n$ different time delays at increments of $1/f_o$.

In the known averaging memory shown in FIG. 5 the resistor $R(t)$ is fixed in value. We have found that true time-averaging can be obtained by arranging that $R(t)$ is increased before or after each scanning cycle such that the averaging RC time constant is approximately equal to the time which has elapsed since the start of the measurement. This can be arranged by means of a suitable network or array of resistors which are switch through appropriate switches controlled by a counter which is incremented after each scan.

Figure 6:
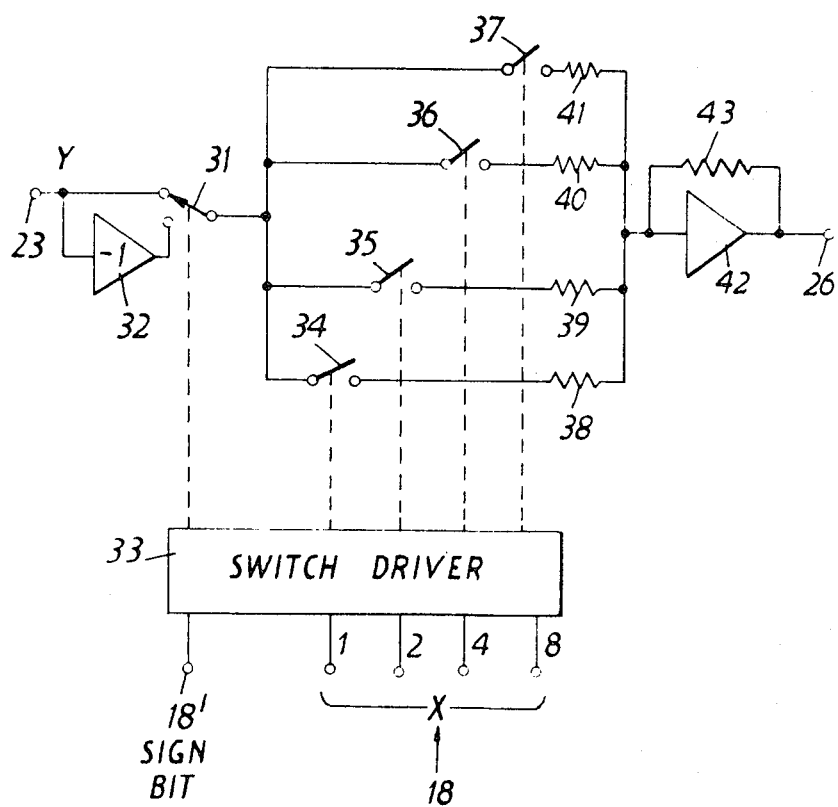

Referring to FIG. 6, this is a circuit diagram of a hybrid multiplier. The analogue input Y is applied at the input 23 and the digital input X is binary and applied in parallel at 18 together with a sign-bit indicating + or − applied at 18'.

The Y-input is applied directly to one input of a selector switch 31 and through an inverting amplifier 32 of unity gain to the second input of the selector switch 31. The X-input includes the sign-bit applied at 18' and this operates to control the switch 31 through a switch-driver circuit 33 which merely provides adequate power for operating the switches shown. When the sign of X is negative the sign-bit causes the selector switch 31 to select the input through the amplifier 32. When the sign-bit is positive it causes the selector switch 31 to select the direct Y-input from 23.

The output of the switch 31 is connected through switches 34, 35, 36 and 37 in series with conductances 38, 39, 40 and 41 respectively to the input of an operational amplifier 42 with feedback conductance 43.

The conductances 38–41 are binary weighted, i.e., have values in the ratios 1, 2, 4 and 8 for the 4-bit arrangement shown. With this arrangement the gain of the operational amplifier is $g_i/g_f$ where $g_i$ is total input conductance determined by which of the switch 34 to 37 are closed and $g_f$ is the conductance of 43.

The operation of the switches 34 to 37 is governed by the binary digits of the X-signal and hence the analogue output at 26 is dependent upon the product of the binary X-signal and the analogue Y-signal.

The switches shown as mechanical switches in FIG. 6 can of course be in electronic form.

What is claimed is:

1. A real-time correlator, comprising first and second inputs to receive first and second signals $x(t)$ and $y(t)$ to be correlated, a first signal-sampler connected to said first input to provide samples of $x(t)$ at a recurrence period of $n/f_o$ where $n$ is an integer of at least 2 and $f_o$ is a given frequency, a recirculating memory having a circulating time of $(n+1)/f_o$, means coupling said first sampler to said recirculating memory to inject each sample of $x(t)$ as it occurs into said recirculating memory with erasure of any previous sample occupying the position in the recirculating memory at which the injected sample is received, means coupling the recirculating memory to a multiplier to apply thereto the sequence of samples circulating in said memory, a second signal-sampler connected to said second input to provide samples of $y(t)$ at said recurrence period $n/f_o$ each for an interval of $n/f_o$, means to apply said samples of $y(t)$ to said multiplier, an averaging memory of $n$ stages driven at a clock-frequency $f_o$, and means for applying the output of said multiplier to said averaging memory to provide an output representative of the correlation function of $x(t)$ and $y(t)$ for $n$ different time delays at increments of $1/f_o$.

2. A real-time correlator as claimed in claim 1, wherein said recirculating memory is a digital shift register with a feedback path from output to input.

3. A real-time correlator as claimed in claim 2, and comprising an analogue-to-digital converter connected between said first sampler and said recirculating memory.

4. A real-time correlator as claimed in claim 3, wherein the multiplier is a hybrid multiplier-to-receiver digital input from said recirculating memory and analogue input from said second sampler.

5. A real-time correlator according to claim 1, wherein said means coupling said first sampler to said recirculating memory comprise means to break a recirculating path of said recirculating memory to erase a signal therein and means to inject a sample in place of said erased signal.

* * * * *